Patented Apr. 1, 1930

1,752,724

UNITED STATES PATENT OFFICE

IGNACE BOURIE, OF RENO, NEVADA

INTERNAL-COMBUSTION-ENGINE FUEL

No Drawing.    Application filed March 4, 1926.   Serial No. 92,326.

The object of my invention, generally stated, is to utilize to a very high degree in its use in internal combustion engines, gasoline and other hydrocarbon fuels, and at the same time secure advantages which are hereinafter set forth, and which will be appreciated by those skilled in the art in regard to the action or behavior of the engine.

My invention consists in whatever is described by or is included within the terms or scope of the appended claim.

I have discovered that by the addition to the gasoline or other hydrocarbon fuels used in explosive or internal combustion engines of a very small proportion of alcohol, especially in the case of power plants of automobiles, there is secured an increase in power of from forty to seventy-five per cent; that there is a like increase in mileage per gallon of gasoline and in some cases as high as one hundred per cent increase; the engine starts without priming; the engine or motor has greater flexibility; carbon deposit is eliminated; and a saving of lubricating oil is effected from fifty to seventy-five per cent.

As illustrative of the proportion of alcohol to gasoline or crude oil, the results above mentioned are obtained when one ounce of denatured alcohol is mixed with from ten to fifteen gallons of gasoline or crude oil. I, of course, do not restrict myself to this particular proportion, but contemplate any proportion in which there is a relatively small quantity of alcohol used. It will be seen that I do not use the alcohol as fuel, but the fuel is essentially gasoline or other hydrocarbon.

Alcohol of any description may be used whether denatured, wood, grain or other description. And, of course, I do not restrict myself to motors or engines of automobiles, as my invention is applicable to any type or kind of internal combustion engine using gasoline or other hydrocarbon fuel.

I preferably mix with the alcohol a small quantity of reagent to neutralize or suppress the alcohol odor, and I preferably use a small quantity of coloring matter which gives an appearance other than that of alcohol.

I have found that when alcohol is mixed with the gasoline in accordance with my invention there is a light film or scum on the interior surface of the receptacle or tank, and upon the interior surfaces of the feed pipes, cylinders and all the parts from the feed pipe to the cylinders through which the fuel passes, and this film or deposits acts upon the gasoline even though when the gasoline or fuel is placed in the supply tank there may be no addition of alcohol in accordance with my invention for several successive fillings of the tank.

What I claim is:

A fuel for internal combustion engines consisting wholly of gasoline with a relatively small proportion of alcohol in the proportion of substantially one ounce of alcohol to from ten to fifteen gallons of gasoline.

In testimony whereof I hereunto affix my signature.

IGNACE BOURIE.